May 2, 1967 MAX M. LIANG 3,317,914

INCREMENTAL TAPE DRIVE RECORDING SYSTEM

Filed Jan. 2, 1964

MAX M. LIANG
INVENTOR.

BY Stuart Lubitz
ATTORNEY

United States Patent Office 3,317,914

Patented May 2, 1967

3,317,914

INCREMENTAL TAPE DRIVE RECORDING SYSTEM

Max M. Liang, San Mateo, Calif., assignor to Ampex Corporation, Redwood City, Calif., a corporation of California Filed Jan. 2, 1964, Ser. No. 335,168
7 Claims. (Cl. 346—74)

This invention relates to a method and apparatus for incrementally positioning the magnetic medium in a magnetic recorder. More particularly this invention relates to a method and apparatus that increases the rate at which magnetic medium may be moved from position to position in an incremental magnetic recorder system.

In the past, incremental type recorders have been similar to the system shown in FIGURE 2. In this conventional system the writing and incrementing functions are initiated by a write and move or increment command received from one of the well known programing or input devices. In response to this command, data is immediately written on the medium and simultaneously the move command is transmitted to the motor controller to advance the tape to the next increment. Referring to FIGURE 1, in this type of system the earliest time that the next write command may be processed is determined by the relationship that total time equals $t_L+t_S+t_T$, wherein $t_L$ is the lag time or period during which there is no displacement of the tape and the stepping motor is being energized to drive the tape, $t_S$ is the switching period during which the tape is advanced from one increment to the next and $t_T$ is the transient period during which the tape oscillates and comes to a stop or to an oscillation of a given amplitude (position tolerance). The period $t_L$ is largely determined by the electrical and magnetic characteristics of the motor and the load driven by the motor. The period $t_S$ is largely determined by the system inertia, the torque available and the incremental distance which the tape is driven. The period $t_T$ is largely determined by the velocities attained, the damping available and the position tolerance acceptable. The position tolerance is generally defined as the amount of oscillatory movement that is allowable while recording is taking place.

The invention described herein takes advantage of the fact that during the lag time there is no displacement. With this fact recognized it was conceived that by delaying the write operation for a period slightly shorter than the lag period $t_L$, the transient period $t_T$ of the previous cycle could be shortened or lengthened by an equivalent amount. The shortening of the transient period $t_T$ by utilizing the lag period $t_L$ for this purpose shortens the total time necessary for a given incrementing and writing operation. Since the maximum incrementing rate of the system is the reciprocal of the total time, it can be seen that the maximum incrementing rate is increased by the invention.

The general object of this invention is the provision of an improved method and system for incrementing a magnetic medium;

Another object of this invention is the provision of an incrementing system that will move a magnetic medium at a higher incrementing rate;

Another object of this invention is the provision of a method and apparatus wherein the motor controller is energized during the transient period and the writing of the magnetic tape takes place during the final moments of the lag period.

These and other objects will be readily understood when the detailed description is read in connection with the drawings wherein.

Figure 4:
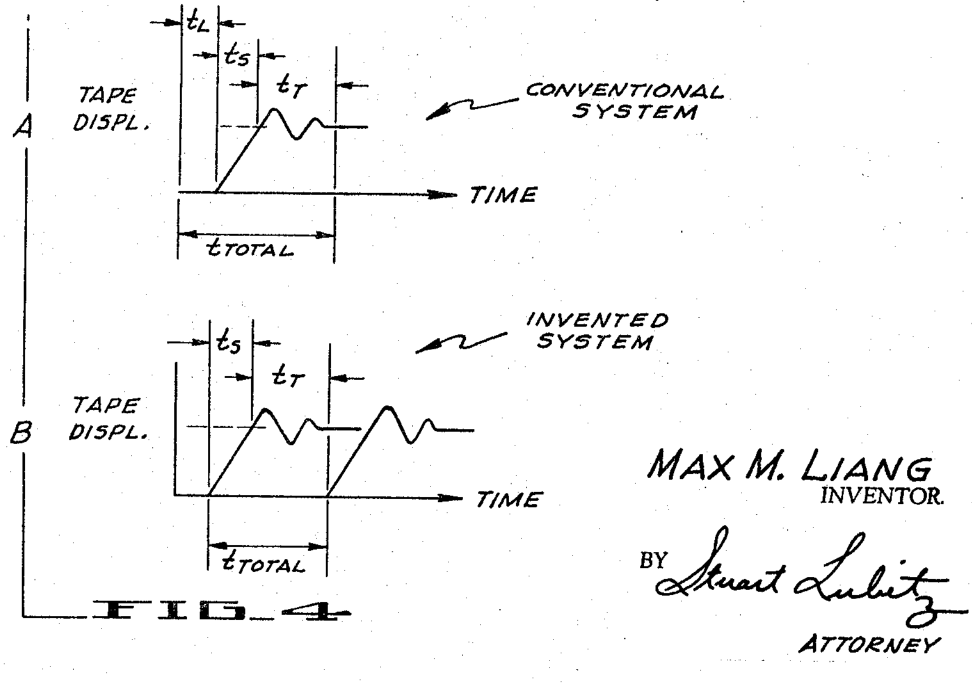

FIGURES 4A and B are tape or medium displacement versus time diagrams for a conventional system and the invented system respectively.

Figures 1, 2:
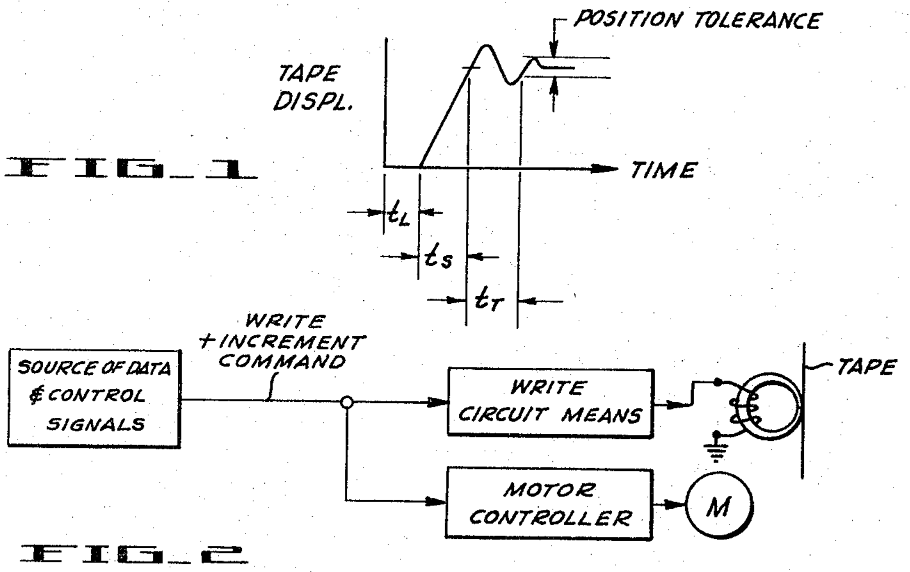
FIGURE 1 is a tape or medium displacement versus time diagram showing the various periods which make up a total time required to write and increment the medium from one position to another.
FIGURE 2 is a block diagram of a conventional write and incrementing system.
Figure 3:
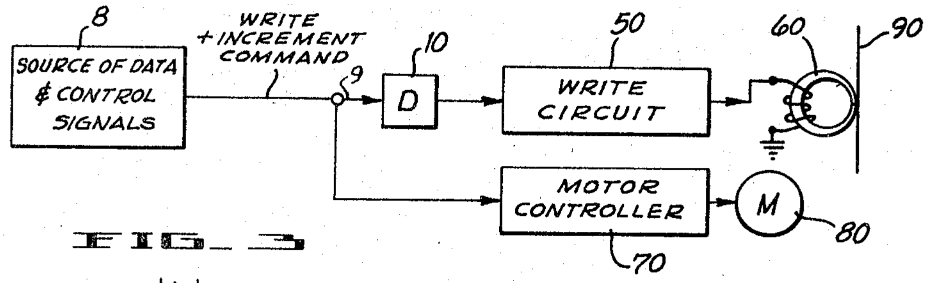
FIGURE 3 is an embodiment of the improved write and incrementing system.

Referring to FIGURE 3 the invented system comprises a delay means 10 connected to a write circuit means 50 which in turn is connected to the magnetic write head 60. The delay means or delay circuit means 10 may be any of the well known electro-mechanical, electrical or electronic delay means that functions to delay an input signal for a given period. A typical electronic delay circuit means 10 is shown in the book "Transistor Circuits" by K. W. Cattermole, published by the London Hayward Co., Ltd., pages 336–337 (1959). The write circuit means 50 may be any of the well known write circuits commonly used in magnetic or punch recording and more particularly in digital type of magnetic recording such as is shown in U.S. Patent 2,900,215 issued to S. Scheon on Aug. 18, 1959 and U.S. Patent 3,056,950 issued to D. J. Birmingham, et al. on Oct. 2, 1962. The write circuit means 50 is connected to a transducer or magnetic recording head 60 that is operatively coupled to the medium 90.

A source of data and control signals 8 that generates a write and incremental pulse or command is connected to the input terminal 9 of the delay circuit means 10 and is also connected directly to the control means or motor controller 70. The motor controller 70 is described in detail in U.S. Patent application 334,989 filed on Jan. 2, 1964, now U.S. Patent 3,281,630 invented by Max Ming-Tsu Liang and assigned to the assignee of this application. The motor controller 70 functions to energize a moving means or stepping motor 80 such as is described in U.S. Patent 2,834,896. This type of motor functions to move the recording medium a given increment each time it is energized by the motor controller 70.

The understanding of the invented incrementing and writing system may be facilitated by considering a typical operational sequence. The source of data control signals 8 will generate a write and increment pulse or command which is delivered to the terminal 9 to energize the delay circuit means 10 and immediately energize the motor controller 70. The motor controller 70 will instantaneously begin to energize the stepping motor 80. The stepping motor 80 will not, however, begin to move until the end of the lag period $t_L$ which is moments later. During this lag period $t_L$ when the motor is being energized, the medium and motor are experiencing an oscillation caused by the previous incrementing operation of the motor 80. When the lag period $t_L$ approaches its end, the delay circuit means 10 transmits the delayed write command to the write circuit means 50 which in turn energizes the recording head 60 to record an information signal on the magnetic medium 90. It should be noted that the write operation takes place at an instant before the lag period $t_L$ ends an instant after the transient period $t_T$ has ended. The transient time period $t_T$ ends at the instant when an acceptable position tolerance is achieved. With the transient time period $t_T$ at an end and the writing operation completed, the time lag period $t_L$ ends and the stepping motor 80 increments the magnetic medium 90 to its next position and transient period $t_T$ begins anew. From this operational description it can be seen that when there is a maximum overlap between the period $t_L$ and the transient period $t_T$ the total time is at its minimum value.

From a comparison of the displace time diagrams of FIGURE 4A–B it can be seen that an improved method and system for incrementing and writing on a magnetic medium has been invented. In FIGURE 4A the time displacement diagram for the conventional system is shown while in FIGURE 4B the time displacement diagram for the invented system is shown. From a comparison of FIGURES 4A and 4B it can be seen that the total time required to write and increment the tape is considerably longer in the conventional system than the total time required to perform the same operations in the invented system.

While the above detailed description has shown, described and pointed out the fundamental novel features of the invention as applied to a preferred embodiment, it will be understood that various omissions and substitutions and changes in the form and details of the device and method illustrated may be made by those skilled in the art, without departing from the spirit of the invention. It is the intention, therefore, to be limited only as indicated by the scope of the following claims.

What is claimed is:

1. In an apparatus for recording information on a recording medium while incrementing said recording medium the apparatus including, a stepping motor operatively coupled to the medium which motor experiences a lag time period prior to increment movement after being energized and an oscillation time period after the increment movement, motor controller means for energizing the motor, write circuit means operatively coupled to the recording medium, and source means for introducing write and increment signals to the write circuit means and the motor controller means respectively, the improvement comprising; delay means connected between the source means and the write circuit means for delaying for a predetermined delay time period the write signal transmitted to the write circuit means, such that the stepping motor is energized prior to energizing the write circuit means and the write circuit means writes prior to subsequent movement of the energized stepping motor.

2. The improvement of claim 1 wherein the delay means generates a predetermined delay time period of a duration slightly less than said lag time period of the stepping motor.

3. The apparatus of claim 1 wherein the delay means generates a predetermined delay time period of a duration within the range of values slightly greater than zero to slightly less than the value of said lag time period.

4. The improvement of claim 1 wherein said delay means comprises an electronic delay circuit.

5. A method for incrementing a recording medium with a driving means while writing thereon with a write means wherein the driving means experiences an inherent lag time period equal to the time it begins its increment movement after being energized and experiences an oscillation time period after the increment movement, the method comprising the steps of;

- energizing the driving means to increment said recording medium; and
- energizing the write means to write on the recording medium a predetermined delay period after energizing the driving means, said delay period being less than the inherent lag time period, whereby writing takes place at one moment and increment movement of the energized driving means takes place a very short instant later.

6. The method of claim 5 wherein the driving means is energized prior to the end of the oscillation time period of the previous increment movement thereof, and the write means is energized after the end of the oscillation time period and prior to the increment movement of the energized driving means.

7. The method of claim 5 further comprising the step of;

- generating an electrical pulse for energizing said driving means and said write means, whereby the write means writes on the recording medium after energization and prior to movement of said driving means.

No references cited.

BERNARD KONICK, *Primary Examiner.*

IRVING L. SRAGOW, A. I. NEUSTADT, *Assistant Examiners.*